US007053585B2

(12) United States Patent
Nireki

(10) Patent No.: US 7,053,585 B2
(45) Date of Patent: May 30, 2006

(54) GAMING MACHINE

(75) Inventor: Takao Nireki, Tokyo (JP)

(73) Assignee: Aruze Corp., Tokyo (JP)

( * ) Notice: Subject to any disclaimer, the term of this patent is extended or adjusted under 35 U.S.C. 154(b) by 0 days.

(21) Appl. No.: 11/019,381

(22) Filed: Dec. 23, 2004

(65) Prior Publication Data

US 2005/0140328 A1 Jun. 30, 2005

(30) Foreign Application Priority Data

Dec. 25, 2003 (JP) ............................ 2003-431049

(51) Int. Cl.
*H02P 8/00* (2006.01)
*A63B 71/00* (2006.01)
*A63F 9/24* (2006.01)

(52) U.S. Cl. ..................... 318/696; 273/142 R; 463/20

(58) Field of Classification Search ................ 318/445, 318/696, 362–382; 273/142 R, 143, 138.1, 273/142 H, 143 R; 463/20, 16
See application file for complete search history.

(56) References Cited

U.S. PATENT DOCUMENTS

| | | | | |
|---|---|---|---|---|
| 4,711,451 | A * | 12/1987 | Pajak et al. | 463/22 |
| 5,702,302 | A | 12/1997 | Gauselmann | |
| 6,315,663 | B1 | 11/2001 | Sakamoto | |
| 6,347,795 | B1 * | 2/2002 | De Leljer | 273/143 R |
| 6,471,588 | B1 * | 10/2002 | Sakamoto | 463/20 |
| 6,705,611 | B1 * | 3/2004 | Kato | 273/143 R |
| 6,802,507 | B1 * | 10/2004 | Inoue | 273/143 R |
| 2001/0041611 | A1 | 11/2001 | Loose et al. | |
| 2003/0087690 | A1 | 5/2003 | Loose et al. | |
| 2003/0141838 | A1 * | 7/2003 | Kang et al. | 318/696 |
| 2005/0049032 | A1 * | 3/2005 | Kobayashi | 463/20 |

FOREIGN PATENT DOCUMENTS

| | | | |
|---|---|---|---|
| JP | 10-071240 | | 3/1998 |
| JP | 10-174739 | | 6/1998 |
| JP | 2003-230686 | | 8/2003 |
| JP | 2003-230687 | | 8/2003 |
| JP | 2003-275364 | A | 9/2003 |
| JP | 2003-339944 | | 12/2003 |
| JP | 2004-223301 | | 8/2004 |
| RU | 2053559 | C1 | 1/1996 |
| WO | 99/27506 | A1 | 6/1999 |

OTHER PUBLICATIONS

AMS Advanced Micro Systems, Inc.: "Stepper Motor System Basics", Online, Jul. 8, 2000, XP002323092.

* cited by examiner

*Primary Examiner*—Marlon T. Fletcher
*Assistant Examiner*—Patrick Miller
(74) *Attorney, Agent, or Firm*—Arent Fox PLLC

(57) ABSTRACT

The gaming machine according to the present invention has the reels 3L, 3C, 3R on each of which a plurality of symbols are formed, the stepping motors 59L, 59C, 59R for rotating and stopping the reels, the stop buttons 11L, 11C, 11r for stopping rotation of the reels 3L, 3C, 3R and the microcomputer 40 and the motor drive circuit 49 for controlling rotation and stop of the stepping motors. And both the microcomputer 40 and the motor drive circuit 49 divides the step angle per one step in the stepping motors into a plurality of small step angles, thereby both the microcomputer 40 and the motor drive circuit 49 conducts the step control for the stepping motors based on the divided step angles.

13 Claims, 8 Drawing Sheets

| INTERNAL LOTTERY RESULT | MOTOR DRIVE STATE | PROBABILITY |
|---|---|---|
| BONUS GAME IS INTERNALLY WON | FIRST STEP CONTROL | 118/128 |
| | SECOND STEP CONTROL | 10/128 |
| OTER THAN BONUS GAME | FIRST STEP CONTROL | 2/128 |
| | SECOND STEP CONTROL | 126/128 |

GAMING MACHINE

BACKGROUND OF THE INVENTION

1. Field of the Invention

The present invention relates to a gaming machine, and in particular, to a gaming machine in which a game is conducted by rotating and driving reels on each of which various symbols are formed, like a slot machine.

2. Description of Related Art

Generally speaking, the slot machine mentioned above is constructed so that a plurality of reels are driven by operation of a start lever and stop buttons arranged according to each of the reels are pressed and operated, thereby the reels are stopped and the stopped symbols are aligned in an order of a predetermined winning combination, as a result, game media such as medals are obtained.

The above reels, for example, as disclosed in Japanese Unexamined Publication No. 10-71240, are rotatably supported in a reel unit and rotation drive and stop control of the reels are done by stepping motors arranged in the reel unit. Concretely, based on that the start lever is operated, rotational instruction signals are input to the stepping motors and the reels are started to rotate, thereafter when a player presses and operates the stop buttons, stop instruction signals are input to the stepping motors, thereby drive of the reels is stopped.

Concerning with the above drive/stop control of the reels, as well-known, in the slot machine, when the start lever is operated, internal lottery process is conducted in a CPU arranged on a control circuit board and a winning combination is actually determined. At that time, the CPU conducts stop control of the stepping motors so that the symbols are stopped with a stop symbol combination corresponding to the winning combination, or the CPU intentionally conducts stop control of the stepping motors so that the symbols are not aligned in an order of the stop symbol combination corresponding to the winning combination.

And since the above stepping motors drives and rotates the reels which the player sees and recognizes with high interest, performance and specification of the stepping motors have to be sufficiently considered. In general, as the stepping motors arranged in the reel unit of the slot machine, it is utilized a stepping motor of HB type (hybrid type) which has both merits of a stepping motor of PM type (permanent magnet type) having a relatively small size and capable of producing a relatively large torque and a stepping motor of VR type (variable reluctance type) without the permanent magnet, in which a rotation angle can be finely divided. For example, in a case that such stepping motor has a characteristic of 200 steps/one rotation, the stepping motor is driven by 1–2 phase excitation, thereby the stepping motor concludes to have a characteristic of 400 steps/one rotation and is utilized so as to produce such characteristic. According to such stepping motor, the rotation angle becomes 0.9 degrees per one step, thereby smooth rotation of the reel can be realized when the player sees and recognizes the symbols on the reel. In this case, when the reel is rotated at a constant speed (80 rpm), drive frequency thereof is set to 533.3 pps (400×80 rpm/60 sec).

By the way, as the stepping motor mentioned above, taking manufacturing cost of the reel unit into consideration, it is preferable to utilize the stepping motor with a construction as cheap as possible, for example, it is conceivable to utilize the stepping motor of PM type (permanent magnet type). However, this kind of cheap step motor has only rough resolution and less step number per one rotation.

Therefore, if such stepping motor with intact performance is assembled in the reel unit, rotation smoothness of the reel lacks, thus there will occur a problem that a feeling of discomfort on visibility will be given to the player in comparison with a case of the above mentioned stepping motor. Especially, when the reel is started to rotate (accelerated) or stopped (decelerated), a rickety feeling is given to the player.

SUMMARY OF THE INVENTION

The present invention has been done to dissolve the above problems and has an object to provide a gaming machine in which drive control of the reel can be realized with smoothness similar to a case of the stepping motor of HB type generally utilized, even if the cheap stepping motor is used.

In order to accomplish the above object, according to one aspect of the present invention, it is provided a gaming machine comprising:

a reel on which a plurality of symbols are formed;

a stepping motor for rotating and stopping the reel, the stepping motor rotating with a predetermined step angle per one step;

a motor control device for controlling rotation and stop of the stepping motor;

wherein the motor control device selectively conducts one of first step control in which the predetermined step angle is divided into a plurality of first step angles and the stepping motor is driven based on the first step angle and second step control in which the predetermined step angle is divided into a plurality of second step angles each of which is different from the first step angle and the stepping motor is driven based on the second step angle.

According to the above gaming machine, the motor control device selectively conducts one of first step control in which the predetermined step angle is divided into a plurality of first step angles and the stepping motor is driven based on the first step angle and second step control in which the predetermined step angle is divided into a plurality of second step angles each of which is different from the first step angle and the stepping motor is driven based on the second step angle. Thereby, even if a cheap stepping motor with rough resolution and large step angles is utilized, the reel can be smoothly driven and rotated.

Here, as for the above mentioned "step control", it may be adoptable a control method by which the stepping motor is controlled so as to be able to realize smooth rotation of the reel, similar to the prior reel which is rotated by a precious stepping motor with high resolution. Concretely, the step control will correspond to the control method in which a rotational characteristic as same as or more than the rotational characteristic in a prior case that the stepping motor with 400 steps/one rotation is utilized, can be obtained. For example, if the stepping motor of PM type with 48 steps/one rotation is utilized, the rotational angle per one step becomes 0.9375 degrees by setting the excitation mode to 2W1–2 phase excitation (step control in which the step angle per one step is divided into 8). Therefore, smooth rotation of the reel can be realized similar to the prior stepping motor. That is to say, if the stepping motor with 48 steps/one rotation, the rotational characteristic as same as that in the prior stepping motor can be realized by adopting the excitation mode in which one step is divided less than ⅛.

According to the gaming machine of the present invention, the predetermined step angle of the stepping motor is divided into a plurality of the first step angles in the first step control and into a plurality of the second step angles in the second step control. Thus, even if a cheap stepping motor with rough resolution is utilized, the reel can be smoothly driven and rotated, as a result, the gaming machine having a reel unit with low cost can be obtained.

And the motor control device selectively conducts the first step control in which the predetermined step angle is divided into a plurality of first step angles and the stepping motor is driven based on the first step angle and the second step control in which the predetermined step angle is divided into a plurality of second step angles each of which is different from the first step angle and the stepping motor is driven based on the second step angle. Thereby, it can make a player pay attention to rotational state of the reel and new interest for games can be provided.

The above and further objects and novel features of the invention will more fully appear from the following detailed description when the same is read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings.

DETAILED DESCRIPTION OF THE PREFERRED EMBODIMENTS

Hereinafter, a gaming machine according to the present invention will be described by indicating a slot machine as an example.

Figure 1:
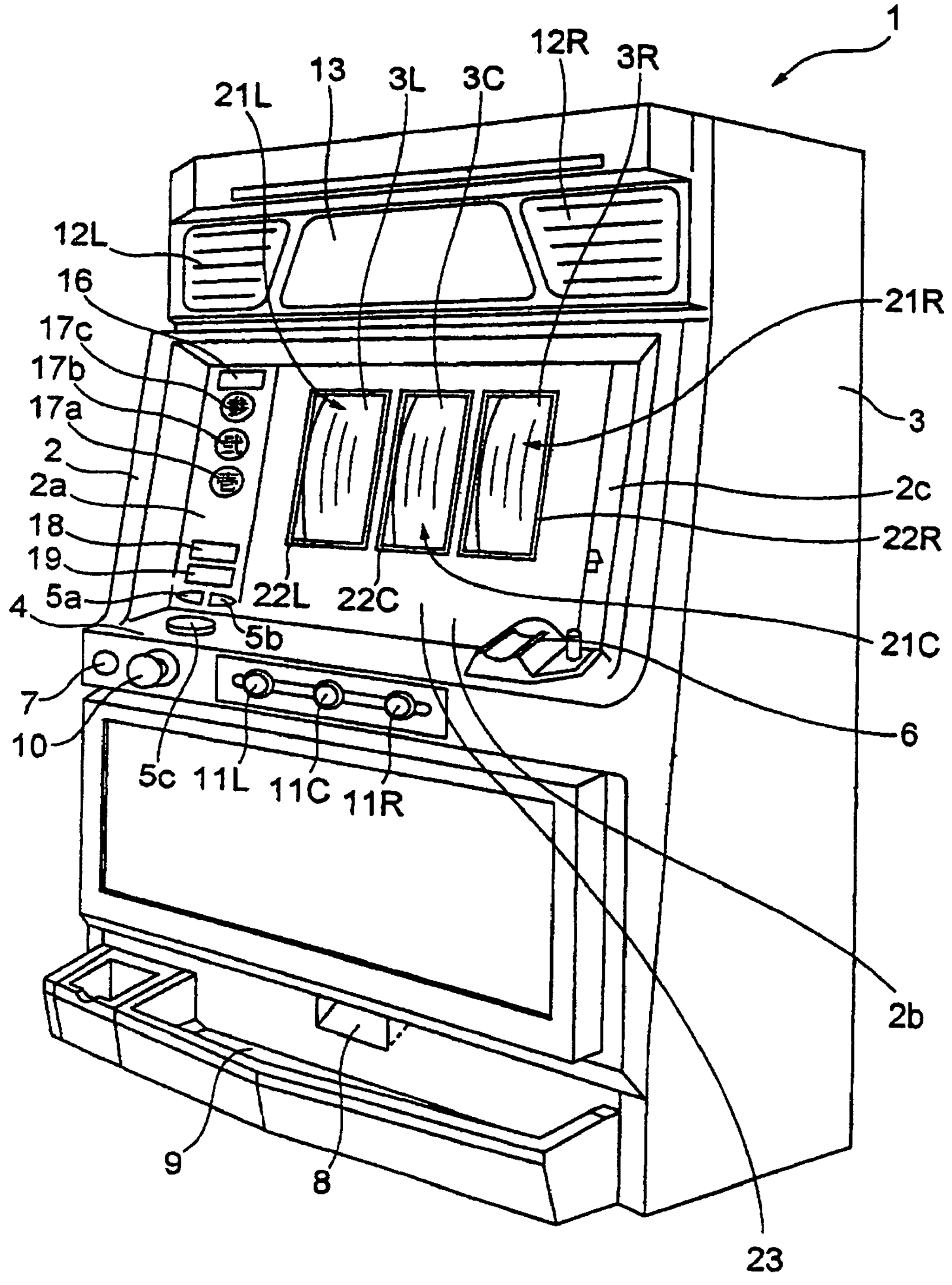
FIG. 1 is a perspective view of a slot machine as an example of a gaming machine.

As shown in FIG. 1, the slot machine 1 has a cabinet 3 at a front plane to which a door 2 (front door) is attached so as to be able to open and close the front plane of the cabinet 3. And on the door 2, there are provided a panel display portion 2*a* positioned at a central upper position of the front plane thereof, a liquid crystal display portion 2*b* forming a liquid crystal display device displaying various effect images thereon and a fixed display portion 2*c*. Inside of the door 2 (at a rear side of the liquid crystal display portion 2*b*), three rotation reels (abbreviated as "reel" hereinafter) 3L, 3C, 3R are rotatably arranged along a horizontal line. On a surface of each reel, a predetermined symbol row is formed and the reels 3L, 3C, 3R are rotatably supported in a reel unit mentioned later. In this case, the symbols formed on each reel can be seen and recognized through rectangular symbol display areas 21L, 21C, 21R. Each reel is constructed so as to be able to rotate at a constant speed (for example, 80 rotations/minute) by a stepping motor.

At lower a position of the panel display portion 2*a*, the liquid crystal display portion 2*b* and the fixed display portion 2*c*, a frontward projection portion 4 is horizontally formed. At the left side of the frontward projection portion 4, it is arranged a maximum BET button 5*c* for betting medals credited in the slot machine 1 by press operation thereof. At an upper position of the maximum BET button 5*c*, a 1-BET button 5*a* and a 2-BET button 5*b* are arranged. At the right side of the frontward projection portion 4, it is formed an insertion slot 6 for betting medals as the game media and at the front left position of the frontward projection portion 4, is arranged a C/P button 7 for changing credit/payout of medals obtained by the player by press operation thereof. By press operation of the C/P button 7, medals are paid out from a medal chute 8 formed at a front lower position of the cabinet 3 and medals paid out are stored in a medal tray 9.

At the right position of the C/P button 7, a start lever 10 is arranged so as to be rotatable within a predetermined angle, the start lever 10 being utilized for starting rotation of the reels by operation of the player and for starting variable change and display of the symbols on the reels within the symbol display areas 21L, 21C, 21R (starting a game). Here, the start lever 10 functions as game start instruction device operable by the player. And at a front center position of the frontward projection portion 4, there are arranged at the right side of the start lever 10 three stop buttons 11L, 11C, 11R to stop rotation of three reels 3L, 3C, 3R, respectively. Here, these stop buttons 11L, 11C, 11R function as stop instruction device to stop rotation of each reel by operation of the player. And the above stop instruction device includes an automatic stop timer which stops the reels after a predetermined time is elapsed, without operation of the stop buttons, as mentioned hereinafter with reference to a flowchart. In the embodiment, the stop buttons 11L, 11C, 11R are arranged, it is not necessary to arrange these stop buttons.

At the right and left positions in an upper part of the door 2, there are arranged speakers 12L, 12R which produce effect sounds to raise interest of the game while the player conducting the game, and a payout table panel 13, on which winning symbol combinations and payout number of medals are displayed so as to be corresponded with each other, is arranged between the above two speakers 12L, 12R.

The panel display portion 2*a* is constructed from a game information display portion 16 displaying information concerning with a bonus game as a special game, BET lamps 17*a*~17C, a payout display portion 18 and a credit display portion 19 displaying a number of medals stored in the slot machine 1. The bonus game information display position 16 is formed from 7 segment LEDS and displays the game information during the bonus game. The 1-BET lamp 17*a*, the 2-BET lamp 17*b* and the maximum BET lamp 17*c* are turned on according to the number of medals betted to conduct the game. The 1-BET lamp 17*a* is turned on when the BET number is "1", the 2-BET lamp 17*b* is turned on when the BET number is "2" and the maximum BET lamp

17*c* is turned on when the bet number is "3". And the payout display portion 18 and the credit display portion 19 are formed from 7 segment LEDs. The payout display portion 18 displays the payout number of medals when the winning combination is realized. The credit display portion 19 displays the number of medals stored (credited) in the slot machine 1. Here, in addition to the above portions, for example, there may be arranged various lamps and display portions such as a lamp displaying game state (WIN lamp and the like), display portions displaying operation times of the reels.

As mentioned, the liquid crystal display portion 2*b* has the symbol display areas 21L, 21C, 21R, window display areas 22L, 22C, 22R and an effect display area 23. The window display areas 22L, 22C, 22R represents frames of the display windows of the symbols formed on the reels 3L, 3C, 3R. In the above liquid crystal display portion 2*b*, various effect images are displayed to raise interest of the game while the game is conducted, and in addition, it may be displayed information necessary for the player to beneficially progress the game and the like.

And the above mentioned fixed display portion 2*c* is an area to display a predetermined image and the image displayed on the fixed display portion 2*c* and the image displayed on the effect display area 23 are formed so as to be able to display one still image or moving image.

Here, the liquid crystal display portion 2*b* is constructed from a transparent liquid crystal display device in which there are provided a protect glass, a display plate, a liquid crystal panel, a light guiding plate, a reflection film, luminescent lamps and a flexible circuit board constructed from a table carrier package (TCP) on which an IC for driving the liquid crystal panel is mounted and connected to terminals of the liquid crystal panel. In this case, display mode of the liquid crystal panel is set to normally white mode, therefore even if it will occur a case that the liquid crystal cannot be driven, the symbols formed on the reels 3L, 3C, 3R can be seen and recognized through the symbol display areas 21L, 21C, 21R and the player can continue the game. And in a case that the liquid crystal corresponding to the symbol display areas 21L, 21C, 21R is not driven, the symbols of the reels 3L, 3C, 3R can be seen and recognized and if the liquid crystal corresponding to the symbol display areas 21L, 21C, 21R is driven, the images displayed in overlapping with the symbol display areas can be seen and recognized.

Figure 2:
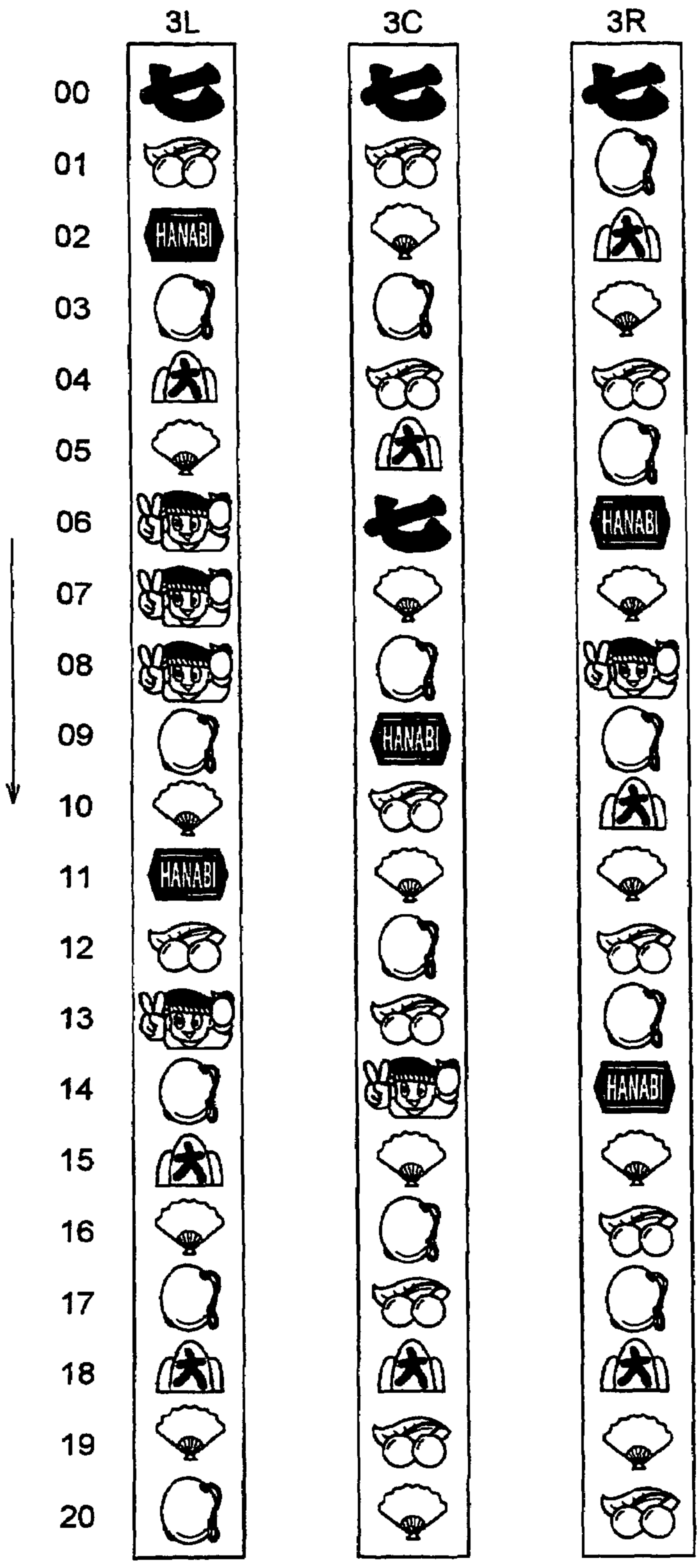
FIG. 2 is an explanatory view of reel bands each of which is attached on a reel arranged in the slot machine shown in FIG. 1.

The symbols formed on the reels 3L, 3C, 3R are constructed, for example, as shown in FIG. 2. In FIG. 2, symbol rows, in each of which a plural kinds of 21 symbols are arranged, are indicated. Each symbol row is formed on each of the reels 3L, 3C, 3R, respectively. Code numbers such as "00"~"20" are attached to each symbol and a table in which each symbol and each code number are corresponded with each other, is stored as a data table in the ROM mentioned later. These symbol rows are moved along a direction indicated by an arrow when each of the reels is driven so as to rotate.

Figure 3:
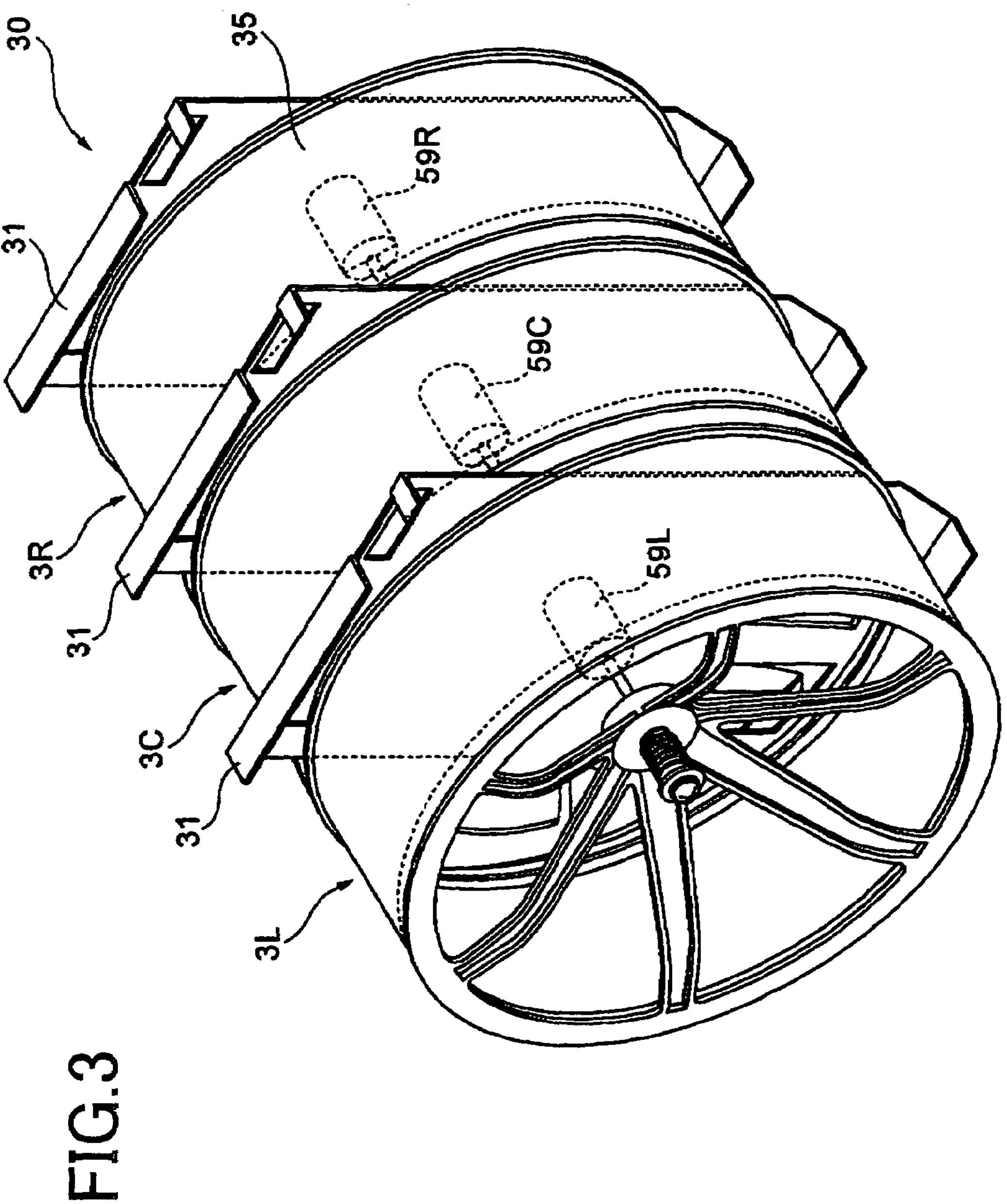
FIG. 3 is a perspective view of a reel unit in which the reels for the slot machine are supported.

Each of the reels 3L, 3C, 3R is, for example as shown in FIG. 3, rotatably supported on one of three installation plates 31 arranged in a reel unit 30 which is formed from resin into one construction. In each installation plate 31, one of the stepping motors 59L, 59C, 59R is positioned at a center position of the reel, thereby the reels are controlled so as to rotate and stop when the stepping motors are controlled so as to drive and stop. In this case, the center portion of each of the reels 3L, 3C, 3R is put on an output shaft of each of the stepping motors 59L, 59C, 59R, thus the reels are constructed so as to be directly driven. Here, it may be adopted a construction using reduction gears.

As the above mentioned stepping motor, for example, the stepping motor of PM type having a characteristic of 48 steps/one rotation (rotation (step) angle is 7.5 degrees per one step) is utilized. In the embodiment, as mentioned hereinafter, one of excitation modes which are different with each other is set to the stepping motor. Concretely, the excitation mode in each stepping motor is selected from 1–2 phase excitation (full step (one step) angle is divided into 2: first step control) and 4W1–2 phase excitation (full step (one step) angle is divided into 16: second step control) and the selected excitation mode is set to the stepping motor.

In this case, if the former excitation mode (first step control) is set to the stepping motor and the stepping motor is rotated with 80 rpm, a drive frequency of a motor control signal becomes 128 pps (48×2×80/60) and the rotation (step) angle becomes 3.75 degrees per one step. At that time, rotation of the reels will give the player seeing the reels a feeling as if the reels rotates with more or less clumsy especially at the time that rotation of the reels are started and stopped. And if the latter excitation mode (second step control) is set to the stepping motor and the stepping motor is rotated with 80 rpm, the drive frequency of the motor control signal becomes 1024 pps (48×16×80/60) and the rotation (step) angle becomes 0.459 degrees per one step. At that time, rotation of the reels will give the player seeing the reels a feeling as if the reels smoothly rotates at all time. Each excitation mode is set when a mode set signal is input to a drive IC mounted on the motor drive circuit which functions as the motor drive device mentioned later and clock pulses corresponding to the drive frequency are input to the stepping motor.

And in the embodiment, two excitation modes different with each other is selected according to a gaming state. Concretely, in a normal gaming state, the latter excitation mode (second step control) is selected and the reels are driven and controlled. And when a bonus game which is a special gaming state is internally won by the internal lottery device (internal winning combination determination device), the former excitation mode (first step control) is selected so as to conduct rotation effect of the reels and the reels are driven and controlled.

Next, a control device for controlling progress of the game in the slot machine will be explained.

As mentioned, the slot machine according to the embodiment has the transparent liquid crystal display device to raise effect and it is required to control image display on the liquid crystal display device based on enormous image data and to control sound data for producing complex effect sounds corresponding thereto and to control blink of light. In order to realize this, in the embodiment, control device for controlling progress of whole game is mounted on a circuit board (main control circuit board) which mainly controls game processes and the other control device for controlling processes (image display control process for controlling images displayed on the liquid crystal display device, sound control process for controlling sounds produced from the speakers, effect control process for controlling various effects) is mounted on a sub-control circuit board which is separated from the main control circuit board and executes above processes based on various commands output from the main control circuit board.

Figure 4:
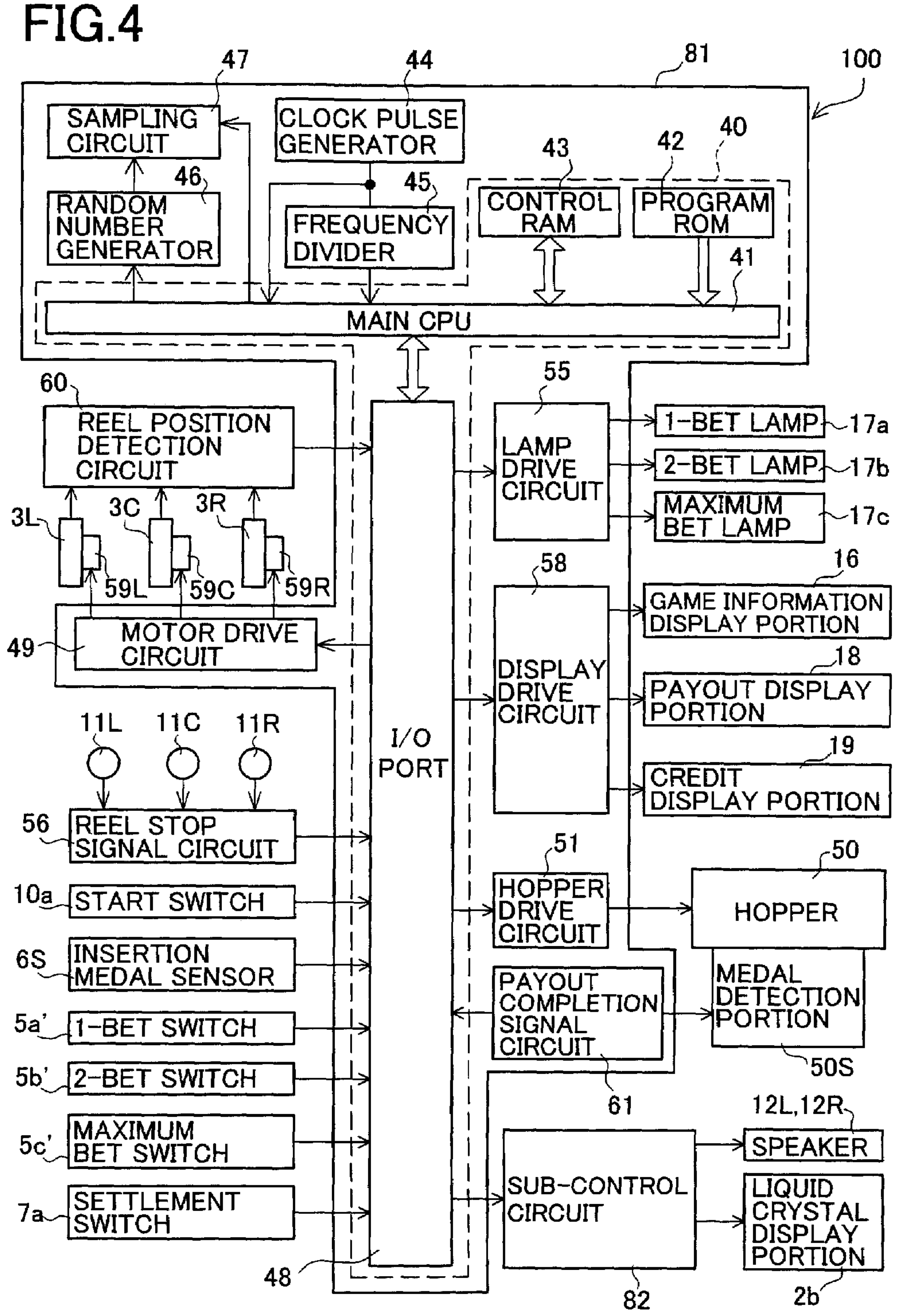
FIG. 4 is a block diagram which shows a constructive example of a main control circuit board for controlling gaming operation of the slot machine, FIG. 5 a block diagram showing an example of a motor control device.

FIG. 4 is a block diagram showing an example construction of the main control circuit board.

The main control circuit board 100 has a main control circuit 81 for controlling game processes conducted in the slot machine 1. This main control circuit board 81 is mainly constructed from a microcomputer 40 arranged on the circuit board and a random number sampling circuit 47 is added to the microcomputer 40. The microcomputer 40 has a main CPU 41 (abbreviated as "CPU" hereinafter) with function to control various actuators according to a preinstalled program, a program ROM 42 (abbreviated as "ROM" hereinafter) as memory device and a control RAM 43 (abbreviated as "RAM" hereinafter).

To the CPU 41, a clock pulse generator 44 for producing standard clock pulses, a frequency divider 45 for dividing clock pulse into a predetermined frequency, a random number generator 46 for producing random numbers sampled and a sampling circuit 47 for sampling the random numbers produced by the random number generator 46. The random number generator 46 and the sampling circuit 47 constructs the internal lottery device (internal winning combination determination device). Here, as the random number sampling device, the random numbers may be produced in the microcomputer 40, that is, random number sampling may be executed according to the program of the CPU 41. In this case, the random number generator 46 and the sampling circuit 47 may be omitted or may be remained to back up the random number sampling process.

In the ROM 42 of the microcomputer 40, there are stored a probability lottery table utilized when determination in random number sampling is done every the start lever 10 is operated (start operation is done), stop control tables for determining stop modes of the reels corresponding to operation of the stop buttons, sequence program for driving and stopping of the stepping motors as mentioned later and for setting and changing excitation mode of the stepping motors corresponding to a result of the internal lottery process, and various control instruction (commands) transmitted to a sub-control circuit 82 of the sub-control circuit board.

In the main control circuit 81, circumference devices (actuators) are electrically connected. These circumference devices are constructed so as to be operationally controlled by control signals output from the microcomputer 40. As main circumference devices, there exist various lamps (1-BET lamp 17*a*, 2-BET lamp 17*b* and maximum BET lamp 17*c* and the like), various display portions (game information display portion 16, payout display portion 18, credit display portion 19 and the like), a hopper 51 (including drive part for payout) functioning as game value giving device for paying out a predetermined number of medals based on an instruction output from a hopper drive circuit 51 and the stepping motors 59L, 59C, 59R for rotating and driving the reels 3L, 3C, 3R.

Further, a motor drive circuit 49 for executing drive and stop of the stepping motors 59L, 59C, 59R, the hopper drive circuit 51 for driving and controlling the hopper 50, a lamp drive circuit 55 for driving and controlling various lamps and a display drive circuit 58 for driving and controlling various display portions, are connected to an output part of the CPU 41 through a I/O port 48. These drive circuits control operation of each of the actuators when control signals such as drive instructions output from the CPU 41 of the microcomputer 40 are received.

As main input signal producing device for producing input signals which is necessary for the microcomputer 40 to produce control instructions, there exist a start switch 10*a*, a 1-BET switch 5*a*', a 2-BET switch 5*b*', a maximum BET switch 5*c*', a settlement switch 7*a* for settling medals stored in the slot machine 1, an insertion medal sensor 6S, a reel stop signal circuit 56, a reel position detection circuit 60, a payout completion signal circuit 61 and so on. These switches are connected to the CPU 41 through the I/O port 48.

The start switch 10*a*, the 1-BET switch 5*a*', the 2-BET switch 5*b*', the maximum BET switch 5*c*' and the settlement switch 7*a* detect operation of the start lever 10, the 1-BET button 5*a*, the 2-BET button 5*b*, the maximum BET button 5*c* and the C/P button 7, respectively, and the insertion medal sensor 6S detects medals inserted through the medal insertion slot 6. And the reel stop signal circuit 56 produces a stop signal corresponding to operation of each of the stop buttons 11L, 11C, 11R and the reel position detection circuit 60 provides to the CPU 41 a signal to detect the position of each of the reels 3L, 3C, 3R based on a pulse signal output from a reel rotation sensor. Further, the payout completion signal circuit 61 produces a signal to detect medal payout completion when a counted value (number of medals paid out from the hopper 50) by a medal detection portion 50S reaches to a predetermined number data.

The random number generator 46 generates random numbers within a predetermined range and the sampling circuit 47 samples one random number at a voluntary timing after the start lever 10 is operated. And the internal winning combination is determined based on the sampled random number and the probability lottery table stored in the ROM 42. After the internal winning combination is determined, the random number sampling is again conducted to select the "stop control table" which is utilized for stopping the reels.

After rotation of the reels 3L, 3C, 3R is started, the number of drive pulses provided to each of the stepping motors 59L, 59C, 59R is counted and the counted value is written in a predetermined area of the RAM 43. A reset pulse is obtained from each of the reels 3L, 3C, 3R every one rotation of each of the reels, and the reset pulses from the reels are input to the CPU 41 through the reel position detection circuit 60. Based on the reset pulses, the count value of the drive pulse counted in the RAM 43 is cleared to "0" (zero). Thereby, the count value corresponding to the rotational position of each of the reels 3L, 3C, 3R within one rotation thereof is stored in the RAM 43. In order to correspond the rotational positions of the reels 3L, 3C, 3R with the symbols formed on the reels 3L, 3C, 3R, the above mentioned symbol table is stored in the ROM 42. In this symbol table, code numbers (see FIG. 2) and symbol codes are corresponded with each other. Here, the code number is serially given every a predetermined rotational pitch of each of the reels 3L, 3C, 3R under a condition that the rotational position, at which the reset pulse is produced, is utilized as the standard position, and each of the symbol codes indicates the symbol which is formed every each code number.

Further, in the above mentioned ROM 42, the winning symbol combination table is stored. In the winning symbol combination table, the winning symbol combinations, the medal payout numbers and the winning determination codes representing the winning combinations are corresponded with each other. The winning symbol combination table is referred when stop control of the left reel 3L, the center reel 3C and the right reel 3R is conducted and when the winning combination is confirmed after all reels are stopped.

When the winning combination is internally won by the lottery process (probability lottery process) based on the above random number sampling, the CPU 41 executes stop control of the reels 3L, 3C, 3R so that the reels 3L, 3C, 3R are stopped with the stop symbol combination corresponding to the winning combination based on the operation signals transmitted from the reel stop signal circuit 56 at the timing that the player operates the stop buttons 11L, 11C, 11R and based on the selected "stop control table". In a case, the CPU 41 sends the signal so that the reels 3L, 3C, 3R are not stopped with the above stop symbol combination.

In this case, the CPU 41 has function as winning determination device to determine whether or not the symbols of the reels stopped by the stop instruction device corresponds to the stop symbol combination of the internal winning combination determined by the lottery process. If the stopped symbols of the reels become the stop mode indicating that the internal winning combination is realized, the CPU 41 provides a payout instruction signal to the hopper drive circuit 51, thereby a predetermined number of medals are paid out from the hopper 50. At that time, the medal detection portion 50S counts the number of medals paid out from the hopper 50 and when the counted value reaches to the preset value, the medal payout completion signal is input to the CPU 41. Thereby, the CPU 41 stops drive of the hopper 50 through the hopper drive circuit 51, as a result, "medal payout process" is completed.

And the sub-control circuit 82 conducts display control in the liquid crystal display portion 2*b*, sound output control of sounds output from the speakers 12L, 12R and blink control of various lamps, based on various control instructions (commands) from the main control circuit 81. As mentioned, the sub-control circuit 82 conducts various effect control based on the commands sent from the main control circuit. Here, the sub-control circuit 82 never outputs commands or information to the main control circuit 81, thus one way communication is done from the main control circuit 81 to the sub-control circuit 82.

Figures 5, 6:
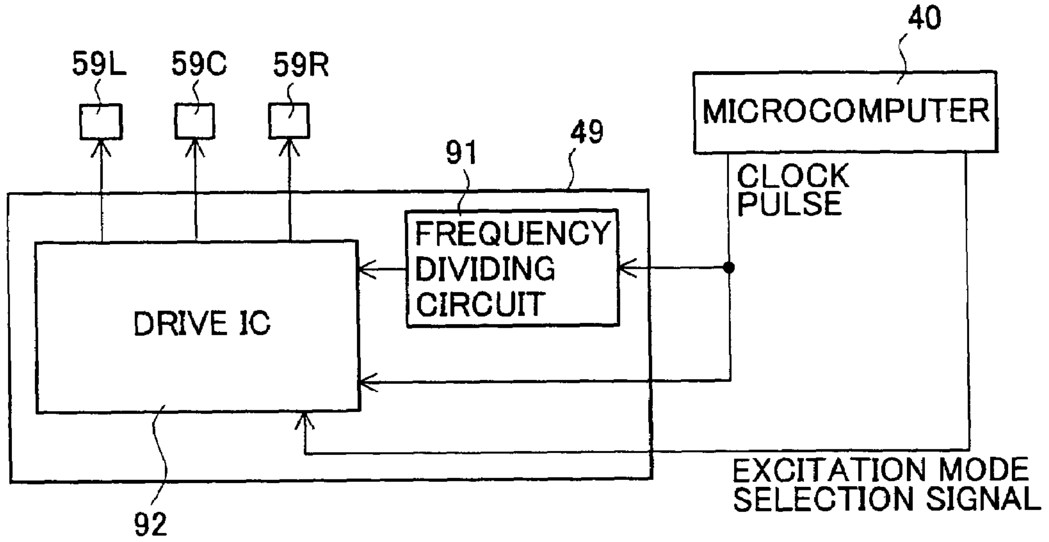
FIG. 6 is an explanatory view of a probability lottery table which is referred when first step control or second step control of the stepping motor is selected.

FIG. 5 is a block diagram showing a constructive example of the motor control means for conducting drive control of the stepping motors which drive each of the reels. The motor control device is mainly constructed from the microcomputer 40 and the motor drive circuit 49. The motor drive circuit 49 has a frequency dividing circuit 91 and a drive IC 92. In this construction, to the drive IC 92, clock pulses of 1024 pps are input (step control of each of the stepping motors is done) from the microcomputer 40, so that each of the stepping motors 59L, 59C, 59R is driven with 4W1–2 phase excitation mode. And as mentioned, when the bonus game is internally won by the lottery process through the internal lottery device, the CPU 41 of the microcomputer inputs the clock pulses of 1024 pps to the frequency dividing circuit 91 and the frequency dividing circuit 91 divides the frequency into ⅛ (128 pps) and inputs such frequency to the drive IC 92. Further, the CPU 41 transmits an excitation mode selection signal to the drive IC 92 so that each stepping motor is driven by 1–2 phase excitation mode. In this case, the stepping motor is driven by the first step control.

Here, it is not necessary to provide the above mentioned frequency dividing circuit 91 in the motor drive circuit 49. For example, the above mentioned clock pulse generator 44 and the frequency divider 45 may be constructed so as to realize the same function of the frequency dividing circuit 91. And in the frequency dividing circuit 91, a specific clock pulses from the microcomputer may be divided into a plural kinds of frequencies (1024 pps, 128 pps) and such frequencies may be input to a frequency selection circuit (not shown), thereby any one of the frequencies may be selected corresponding to an excitation mode selection signal output from the CPU 41 and the selected frequency may be input to the drive IC 92.

And it is not necessary to execute the above first step control when the bonus game is internally won. For example, the lottery process may be conducted according to the probability lottery table and the second step control may be executed with a predetermined probability even if the bonus game may be internally won. Or reversely, if the bonus game is not internally won, the first step control may be executed with a predetermined probability according to the lottery process.

Figure 7:
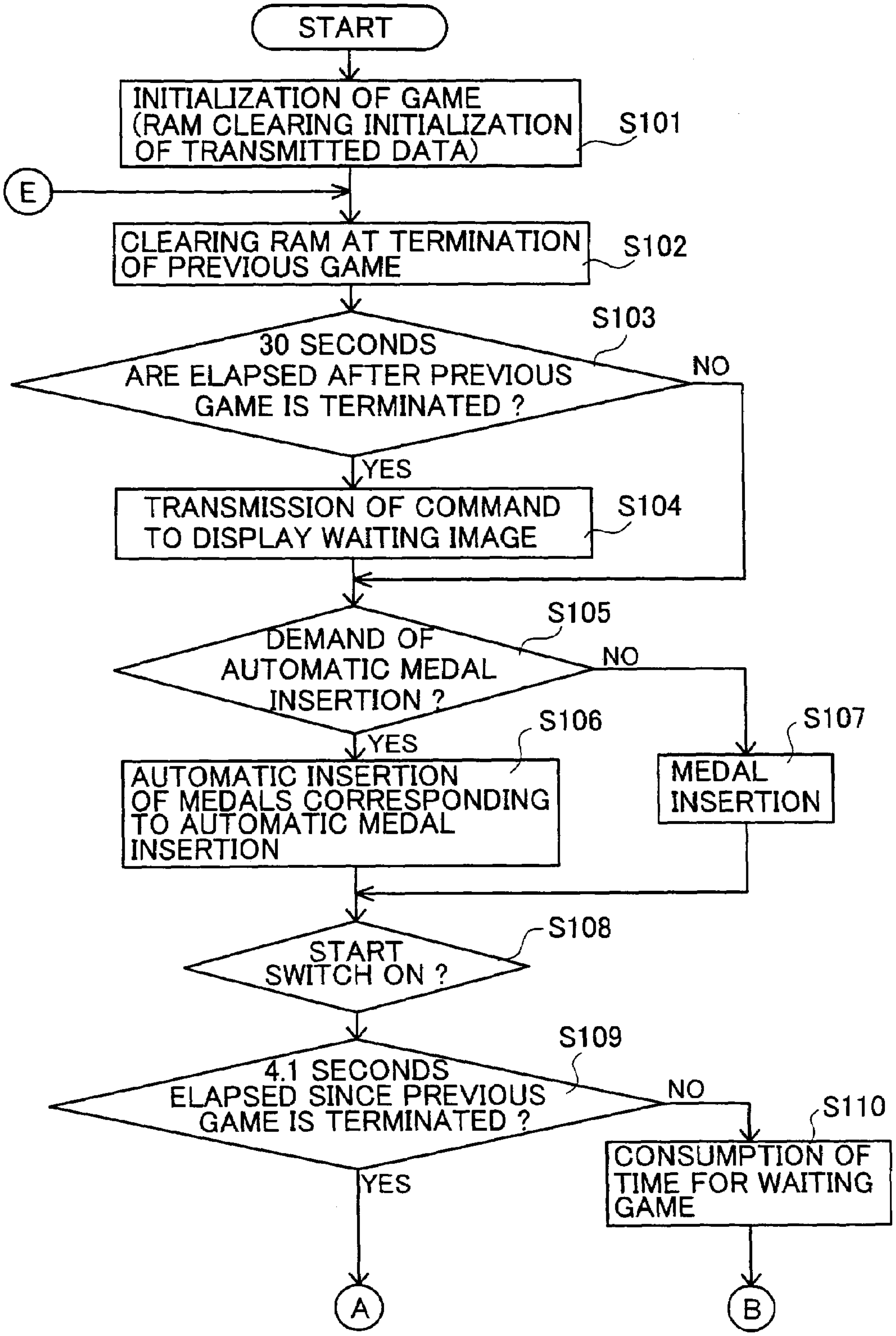
FIG. 7 is a flowchart for explaining control operation of the main control circuit board in the slot machine.
Figure 8:
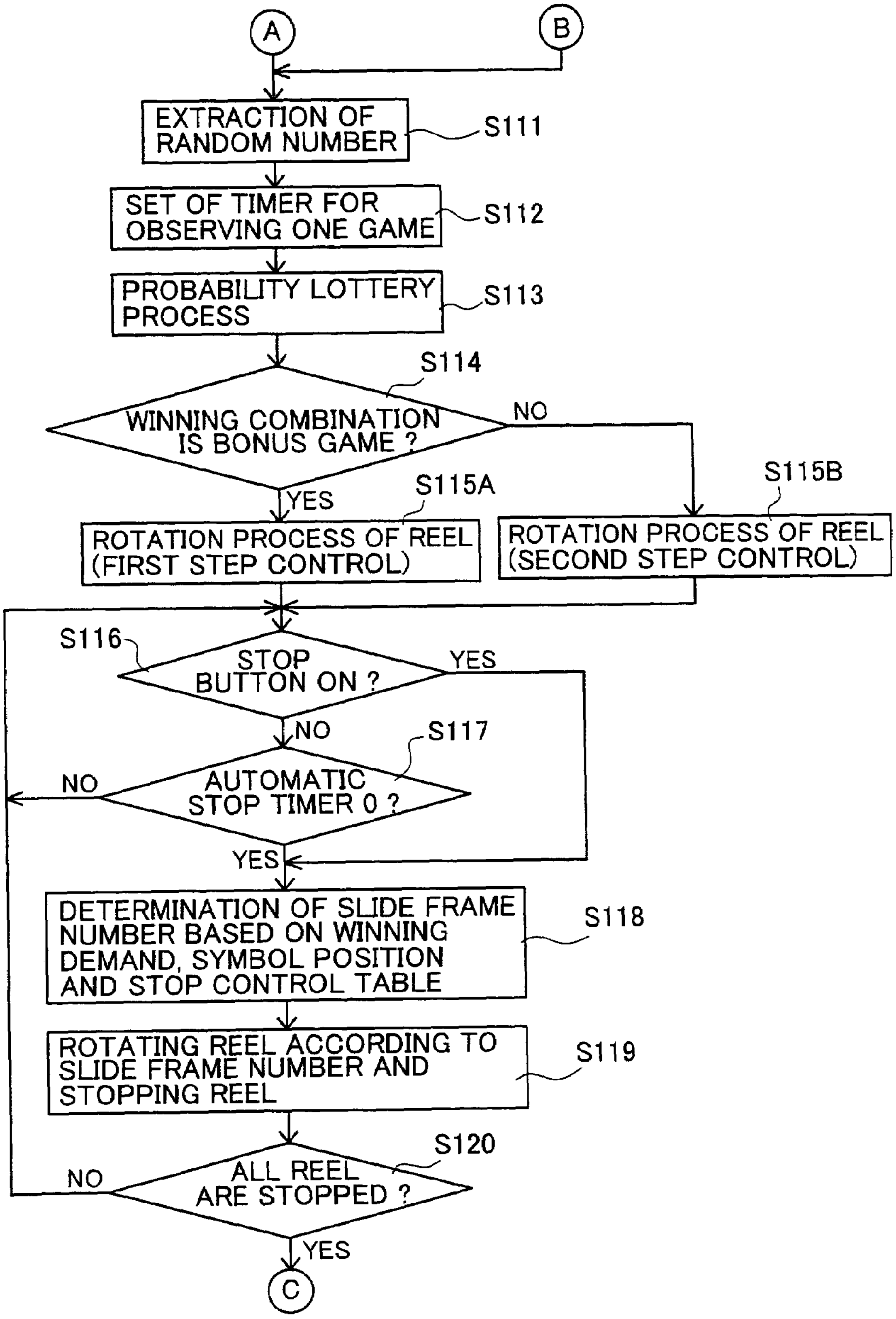
FIG. 8 is a flowchart, which is executed continuous to the flowchart shown in FIG. 7, for explaining control operation of the main control circuit board in the slot machine.
Figure 9:
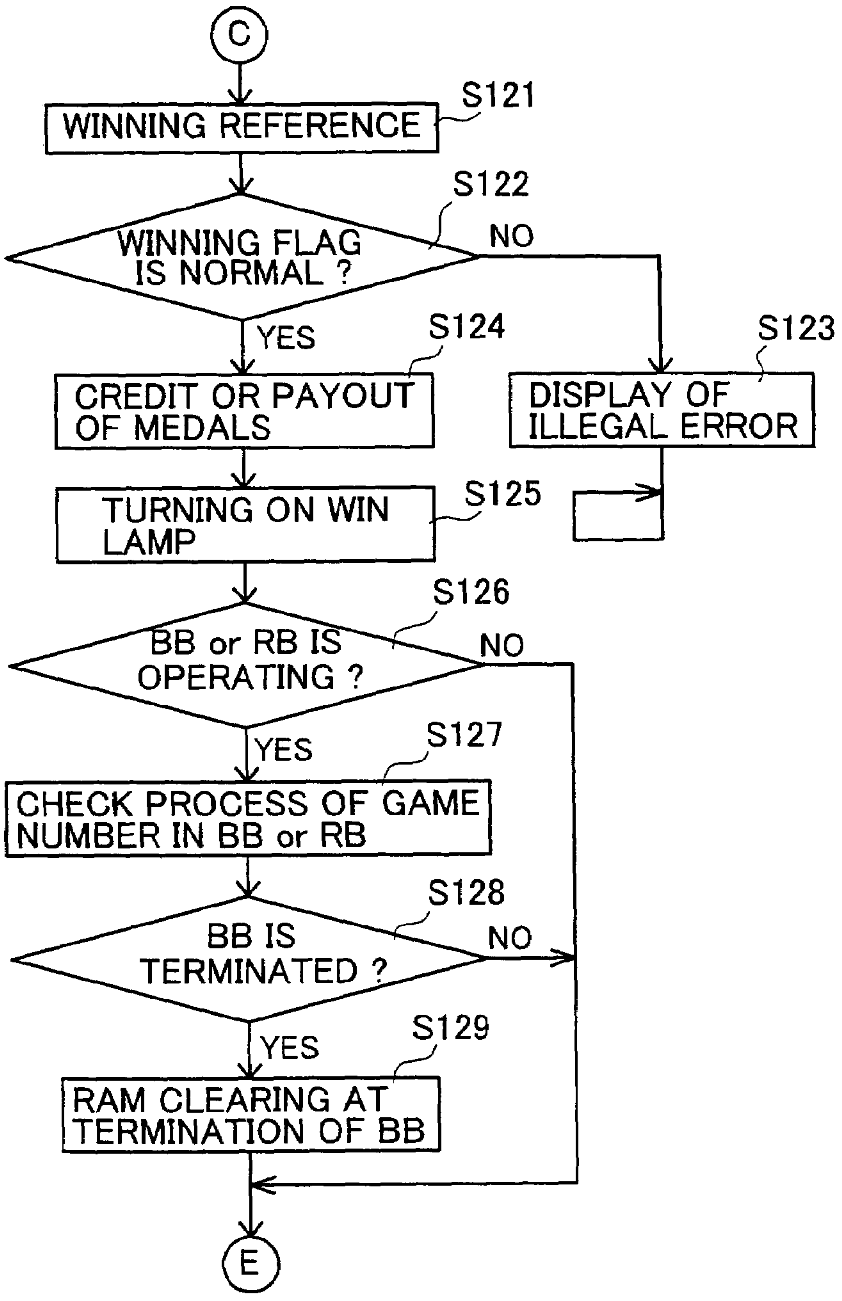
FIG. 9 is a flowchart, which is executed continuous to the flowchart shown in FIG. 8, for explaining control operation of the main control circuit board in the slot machine.

Next, control procedures by the CPU 41 in the main control circuit 81 of the main control circuit board 100 will be described with reference to flowcharts shown in FIGS. 7~9.

First, initialization process is executed when the game is started (S101). Next, the CPU 41 clears the data stored in the control RAM 43 when the previous game is terminated (S102). And it is determined whether or not 30 seconds are elapsed after the previous game is terminated (S103). When 30 seconds are elapsed, a command to display a waiting image is transmitted to the sub-control circuit (S104). If 30 seconds are not elapsed, it is determined whether or not demand of automatic medal insertion exists (S105). Here, a case that demand of automatic medal insertion exists means a case that the winning combination of replay is realized in the previous game. If the demand of automatic medal insertion exists, medals corresponding to automatic medal insertion are automatically inserted (S106), and on the contrary, if the demand of automatic medal insertion does not exist, medal insertion through the medal insertion slot and the BET buttons are accepted (S107). In this case, three medals can be accepted to the utmost limit during a normal game, and one medal can be accepted in the bonus game during BB (Big Bonus) or RB (Regular Bonus).

Next, it is determined whether or not the start input signal from the start switch 10*a* is produced by operation of the start lever 10 (S108). When it is determined that the start switch 10*a* is switched "ON", it is determined whether or not 4.1 seconds are elapsed since the previous game is terminated (S109). And when 4.1 seconds are not elapsed from the previous game, the time for waiting the game is consumed based on waiting function till 4.1 seconds are elapsed (S110). If the start lever 10 is operated before 4.1 seconds are elapsed, sounds indicating that the reels cannot be rotated are output from the speakers 12L, 12R, thereby it is notified to the player that the waiting function is operated.

When 4.1 seconds are elapsed since the previous game is terminated, the random number for lottery generated in the random number generator 46 is extracted by the sampling circuit 47 (S111). Concretely, the random number is extracted within a range of 0~16383. Next, a timer for observing one game is set (S112) and the probability lottery is conducted (S113). In the probability lottery, the internal wining combination is determined based on the random number value extracted in S111 and the probability lottery table corresponding to the present gaming state which is determined in the gaming state observation process. In the probability lottery table, it is predetermined the random number value corresponding to the internal winning combination every winning combination.

When the internal lottery process is terminated, it is determined whether or not the lottery result (winning combination) corresponds to the bonus game (S114). And if the winning combination corresponds to the bonus game, each of the stepping motors is driven by the above mentioned first step control (1–2 phase excitation) and rotation process of the reels is conducted (S115A). And if the winning combination does not correspond to the bonus game, each of the stepping motors is driven by the above mentioned second step control (4W1–2 phase excitation) and rotation process of the reels is conducted (S115B). In rotation process of the reels in both S115A and 115B, the predetermined area of the RAM 43, in which the rotational position of each of the reels 3L, 3C, 3R is written, is initialized by the CPU 41 when rotation of the reels is started, and each of the reels 3L, 3C, 3R is rotated and driven by the predetermined drive mode. Here, as mentioned, when such rotation process of the reel is done, the lottery process of the step control and the first step control may be done according to the probability lottery table shown in FIG. 6.

Next, the CPU 41 determines that the stop buttons are switched "ON" (S116). If it is determined that the stop buttons are switched "ON", the procedure shifts to S118, and if it is determined that the stop buttons are retained in "OFF", the procedure shifts to S117. In S117, it is determined whether or not the value of an automatic stop timer is "0" (zero). If it is determined that the value of the automatic stop timer is "0", the procedure shifts to S118 to automatically stop the reels by not depending on stop operation of the stop buttons. And if it is determined that the value of the automatic stop timer is not "0", the procedure shifts to S116. In S118, it is determined a slide frame number within a predetermined range, for example within 4 slide frames based on the winning demand (which means the internal winning combination), the symbol position (rotational position of the reel when stop operation is done) and the stop control table which is selected.

And the reels are rotated according to the slide frame number determined in S118 and stopped (S119), thereafter it is determined whether or not all reels are stopped (S120). If all reels are not stopped, the procedure returns to S116, and if all reels are stopped, the winning reference process is done by the CPU 41 (S121). In the winning reference process, the CPU 41 determines whether or not the kind of winning flag indicating the symbol combination which is in fact aligned along the pay line and the kind of internal winning combination determined by the probability lottery process, coincide with each other. Thereby, it is determined whether or not the winning flag is normal (S122).

If the winning flag is not normal, display indicating illegal error is done (S123), as a result, the procedure is interrupted. And if the winning flag is normal, medals are credited or paid out in fact (S124). Further, when the process of the medal credit or actual medal payout in S124, is done, turning on process of the WIN lamp is continuously conducted corresponding to the medal credit or medal payout (S125). Next, it is determined whether or not the present game is done while BB or RB is operating (S126). If the present game is done while BB or RB is not operating, the game procedure by the CPU 41 returns to S102 and game control is newly started. And if the present game is done while BB or RB is operating, game number in BB or RB is checked by the CPU 41 (S127).

Next, it is determined whether or not the present gaming state corresponds to the time that BB is terminated (S128). If it is the time that BB is terminated, RAM clearing process is conducted in the RAM 43 when BB is terminated (S129). And the game procedure by the CPU 41 returns to S 102 and game control is newly started. Further, in S128, if it is not the time that BB is terminated, the game procedure returns to S102 and game control is newly started.

According to the above constructed slot machine, each of the stepping motors 59L, 59C, 59R installed in the reel unit 30 is controlled by the second step control (excitation mode by 4W1–2 phase excitation) through the above motor control device, thereby even if the stepping motor with rough solution (for example, the stepping motor with 48 steps/one rotation) is utilized, acceleration and deceleration can be smoothly realized, thus cost of the reel unit can be reduced.

And as mentioned, the stepping motor is driven and controlled according to the gaming state by selecting one of the first step control and the second step control, thereby new interest of games can be added. That is to say, as the above mentioned bonus game, the game giving large benefit is the most interested for the player, and according to the above mentioned slot machine, the player can visually determine that such special gaming state is realized since drive mode of the reels are changed (although the reels are smoothly rotated in the normal gaming state, the reels are clumsily rotated when bonus game is internally won). Therefore, it concludes that the player usually and carefully sees rotational movement of the reels during the game, as a result, interest for games can be raised.

And in this case, as mentioned in the above, if one of the first step control and the second step control is separately determined by the lottery process when the first step control or the second step control is executed, unexpected effect can be given to the game. Therefore, interest for games can be raised. That is, if the above mentioned second step control is executed when bonus game is won, unexpected feeling can be given to the player when bonus game is really won. Or if the first step control is executed when bonus game is not won, expectation can be given to the player.

Although the embodiment according to the present invention is explained in the above, the present invention is not limited to the embodiment. For example, the present invention can be embodied as follows. Although, in the above embodiment, the timing that change of the first step control and the second step control is done is set to the timing that bonus game is won, such timing may be variously modified according to the kind of the gaming machine or gaming state and the like. For example, such timing may be set to the case that the winning combination other than the bonus game is won, or may be changed corresponding to gaming state such as a replay state with high probability, a challenge time (CT), a state that the internal winning combination is carried over. By constructing the gaming machine according the above, various interest can be given to the player.

Further, although, in the above construction, two kinds (plural kinds) of excitation modes for the stepping motor are set, rotational state of the reels may be more variously changed by further increasing excitation modes in the drive IC 92. For example, it may be given to the drive IC 92 of the motor drive circuit the function capable of conducting 2W1–2 phase excitation (full step (one step) angle is divided into 8: the second step control), W1–2 phase excitation (full step (one step) angle is divided into 4: the first step control), and the drive frequency corresponding to the excitation mode may be divided in the frequency dividing circuit 91. Further, such divided drive frequency may be input to the drive IC 92 and the excitation mode may be changed corresponding thereto. As mentioned, if rotational state of the reels is subtly changed according to the gaming state, it concludes that the player sees the rotational state of the reels more carefully, thus interest for games can be raised. And as in the slot machine, if the symbol number formed on each of the reels is set to 21, it is desirable that the second step control is done based on the dividing control according to the least common multiple obtained by the step number per one rotation in the stepping motor and the symbol number (frame number). Concretely, for example, in a case that the reel with 21 symbols (frames) is driven by the stepping motor with 48 steps/one rotation, the least common multiple obtained by the step number per one rotation in the stepping motor and the symbol number (frame number) becomes 336. Therefore, the step number per one symbol (frame) can be evenly set to 16 steps over entire periphery of the reel by conducting 7-dividing control (14-dividing control, 21-dividing control may be utilized). As a result, it can be given to the player the feeling as if rotation of the reels is naturally conducted.

And the above mentioned construction of the stepping motor and the motor drive circuit to conduct the above second step control by dividing step angle of the stepping motor, may be voluntarily modified.

In addition to the slot machine described in the above embodiment, the present invention can be adopted to various gaming machines in which gaming device and the like are driven and rotated by utilizing the stepping motors.

What is claimed is:

1. A gaming machine comprising:

a reel on which a plurality of symbols are formed;

a stepping motor for rotating and stopping the reel, the stepping motor rotating with a predetermined step angle per one step;

a motor control device for controlling rotation and stop of the stepping motor; and a first lottery device for determining a winning mode of a game by a random number lottery process when the game is executed:

wherein the motor control device selectively conducts one of first step control in which the predetermined step angle is divided into a plurality of first step angles and the stepping motor is driven based on the first step angle and second step control in which the predetermined step angle is divided into a plurality of second step angles each of which is different from the first step angle and the stepping motor is driven based on the second step angle, wherein the motor control device selects the first step control or the second step control based on a lottery result through the first lottery device, and wherein the motor control device selects the first step control when a special gaming state producing a special benefit occurs based on the lottery result through the first lottery device and selects the second step control when the special gaming state does not occur based on the lottery result through the first lottery device.

2. The gaming machine according to claim 1, wherein the motor control device selects the first step control or the second step control corresponding to a gaming state in the gaming machine.

3. The gaming machine according to claim 1, further comprising:

a controller outputting a clock pulse with a predetermined frequency and an excitation mode selection signal to select a first excitation mode corresponding to the first step control or a second excitation mode corresponding to the second step control;

a frequency dividing circuit to which the clock pulse is input from the controller, the frequency dividing circuit dividing the input clock pulse into a frequency corresponding to the first step control; and a drive IC to which the clock pulse and the excitation mode selection signal are input from the controller.

4. The gaming machine according to claim 3, wherein the predetermined step angle is divided into the first step angles based on the clock pulse divided in the frequency dividing circuit and input to the drive IC from the frequency dividing circuit when the excitation mode selection signal for selecting the first excitation mode is input to the drive IC from the controller, and wherein the predetermined step angle is divided into the second step angles based on the clock pulse input to the drive IC from the controller when the excitation mode selection signal for selecting the second excitation mode is input to the drive IC from the controller.

5. The gaming machine according to claim 1, further comprising:

a second lottery device for determining the first step control or the second step control by a lottery when a special gaming state producing a special benefit occurs based on the lottery result through the first lottery device;

wherein the motor control device selects the first step control or the second step control based on the lottery result through the second lottery device.

6. The gaming machine according to claim 1, further comprising:

a second lottery device for determining the first step control or the second step control by a lottery when a special gaming state producing a special benefit does not occur based on the lottery result through the first lottery device;

wherein the motor control device selects the first step control or the second step control based on the lottery result through the second lottery device.

7. A gaming machine comprising:

a reel on which a plurality of symbols are formed;

a stepping motor for rotating and stopping the reel, the stepping motor rotating with a predetermined step angle per one step;

a motor control device for controlling rotation and stop of the stepping motor;

wherein the motor control device selectively conducts one of first step control in which the predetermined step angle is divided into a plurality of first step angles and the stepping motor is driven based on the first step angle and second step control in which the predetermined step angle is divided into a plurality of second step angles each of which is different from the first step angle and the stepping motor is driven based on the second step angle, and wherein the motor control device selects the first step control or the second step control corresponding to a gaming state in the gaming machine.

8. The gaming machine according to claim 7, further comprising:

a first lottery device for determining a winning mode of a game by a random number lottery process when the game is executed;

wherein the motor control device selects the first step control or the second step control based on a lottery result through the first lottery device.

9. The gaming machine according to claim 8, wherein the motor control device selects the first step control when a special gaming state producing a special benefit occurs based on the lottery result through the first lottery device and selects the second step control when the special gaming state does not occur based on the lottery result through the first lottery device.

10. The gaming machine according to claim 8, further comprising:

a second lottery device for determining the first step control or the second step control by a lottery when a special gaming state producing a special benefit occurs based on the lottery result through the first lottery device;

wherein the motor control device selects the first step control or the second step control based on the lottery result through the second lottery device.

11. The gaming machine according to claim 8, further comprising:

a second lottery device for determining the first step control or the second step control by a lottery when a special gaming state producing a special benefit does not occur based on the lottery result through the first lottery device;

wherein the motor control device selects the first step control or the second step control based on the lottery result through the second lottery device.

12. The gaming machine according to claim 7, further comprising:

a controller outputting a clock pulse with a predetermined frequency and an excitation mode selection signal to select a first excitation mode corresponding to the first step control or a second excitation mode corresponding to the second step control;

a frequency dividing circuit to which the clock pulse is input from the controller, the frequency dividing circuit dividing the input clock pulse into a frequency corresponding to the first step control; and a drive IC to which the clock pulse and the excitation mode selection signal are input from the controller.

13. The gaming machine according to claim 12, wherein the predetermined step angle is divided into the first step angles based on the clock pulse divided in the frequency dividing circuit and input to the drive IC from the frequency dividing circuit when the excitation mode selection signal for selecting the first excitation mode is input to the drive IC from the controller, and wherein the predetermined step angle is divided into the second step angles based on the clock pulse input to the drive IC from the controller when the excitation mode selection signal for selecting the second excitation mode is input to the drive IC from the controller.

* * * * *